United States Patent [19]

Lénberg

[11] 4,399,766
[45] Aug. 23, 1983

[54] FRONT WHEEL INDICATOR

[76] Inventor: Rustan W. Lénberg, Kungsportsavenyen 43, Göteborg, Sweden, S 41136

[21] Appl. No.: 274,390

[22] Filed: Jun. 17, 1981

[30] Foreign Application Priority Data

Jul. 2, 1980 [SE] Sweden .................................. 8004895

[51] Int. Cl.³ ............................................. B60Q 1/42
[52] U.S. Cl. .................................................... 116/31
[58] Field of Search ............................ 116/228, 229, 31

[56] References Cited

U.S. PATENT DOCUMENTS

| | | | |
|---|---|---|---|
| 2,104,521 | 1/1938 | Jackson et al. | 116/31 |
| 3,103,909 | 9/1963 | Anderson | 116/31 |
| 3,556,045 | 1/1971 | Williams | 116/31 |
| 3,734,051 | 5/1973 | Dahl | 116/31 |

FOREIGN PATENT DOCUMENTS 534908  2/1955  Belgium .................................. 116/31

Primary Examiner—E. R. Kazenske
Assistant Examiner—David R. Schuster
Attorney, Agent, or Firm—Holman & Stern

[57] ABSTRACT

A front wheel indicator for a motor car comprises a liquid filled capsule for mounting at the steering wheel of a car so a shaft in the capsule, in mounted position, will be inclined with respect to the plumb-line. A pointer including the symbol of two spaced-apart, parallel bands is rotatably mounted on the shaft, and is connected to a float by a link mechanism. The float strives to maintain a high position in the capsule, and will tend to rotate the pointer when the steering wheel is turned. With a suitably selected link mechanism the two bands of the pointer will indicate the occasional position of the front wheels of the car as a result of a turning of the steering wheel.

7 Claims, 8 Drawing Figures

FRONT WHEEL INDICATOR

BACKGROUND OF THE INVENTION

The parking of a car in a narrow pocket will often be difficult as the driver, after having repeatedly rotated the steering wheel clockwise and anti-clockwise, at a critical moment does not know how the front wheels of his car are positioned in relation to the longitudinal middle line of the car.

The aim of the present invention is to propose a front wheel indicator, which is located in an easily viewed position, and which, without any mechanical connection with the front wheels, will provide a clear indication of the occasional angular position of the wheels.

SUMMARY OF THE INVENTION

A front wheel indicator according to the invention includes a fluid filled capsule for mounting at the steering wheel of the car, and encloses an indicator comprising the symbol of two parallel, spaced-apart bands representing the front wheels. The indicator is mounted for rotation about a shaft, which is inclined with respect to the plumb-line, and is connected to a float by means of a link mechanism, which will transfer changes in position of the capsule as a result of a turning of the steering wheel to the indicator.

The steering wheel of a car usually is inclined with respect to the horizontal plane, and the mounting of the capsule at the steering wheel will ensure that a shaft in the capsule will obtain an inclination with respect to the plumb-line. The float strives to maintain a top position within the capsule and will turn the link mechanism in relation to the shaft.

The shaft is preferably threaded along part of its length, and the link mechanism includes a nut for cooperation with the threaded portion.

A link arm from the float is preferably mounted at a sector lever, which encloses the shaft and is swingable about a trunnion, which is located to the opposite side of the shaft, as counted from the float. The trunnion is carried by a cruciform support member which extends in parallel relationship to the sector lever, and is attached to the shaft. At the end of each of its arms the cruciform member carries a rod, which extends in parallel to the shaft and is connected to the nut by a cross brace. The arms are preferably located so the rods may be fitted substantially above the ends of the arc of the sector lever.

A resilient fork fitted midway of the arc of the sector lever extends to and encloses the shaft in an open grip, whereby it is possible, when driving, to take care of the centrifugal forces acting upon the float.

The two pointer bands are preferably individually rotatable in relation to a cross beam carried by the shaft, and interconnected by a parallel track rod, which by way of a bell crank lever is actuated by the nut.

DESCRIPTION OF A PREFERRED EMBODIMENT

Figure 1:
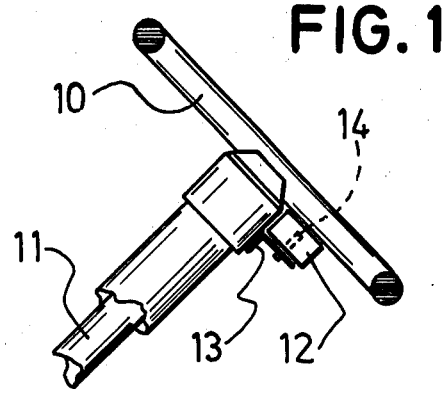
FIG. 1 shows a steering wheel of a motor car provided with an indicator according to the invention.

In most cars the steering wheel is fitted with an inclination to the horizontal plane, which will facilitate the mounting of the present indicator capsule. In FIG. 1 reference 10 denotes a steering wheel, which in a well known manner will rotate a steering rod 11 to actuate a transfer mechanism (not shown) connected to the front wheels of the car.

An indicator device showing the occasional position of the front wheels comprises a liquid-filled capsule 12, which by means of a bracket 13, or some other suitable device, is mounted at the steering wheel so as to be rotatable therewith. Within the capsule there is a shaft 14 acting as a center for diverse components, which will be described in detail therebelow. The shaft is mounted perpendicularly to the bottom of the capsule, but as the latter will be mounted with an inclination to the horizontal plane, the shaft 14 will be inclined to the plumb-line.

Internally the capsule is defined by a circular side wall, but it can preferably be enclosed in a multi-sided, suitably three-sided casing 15, which is mounted at the steering wheel so one corner is directed away from its center.

An indicator 16 is fitted within the capsule, and comprises two parallel, spaced-apart bands 17.

Figure 2:
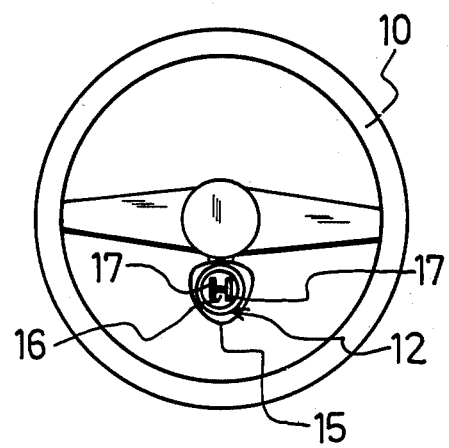
FIGS. 2-4 show the steering wheel in different turning positions.
Figure 3:
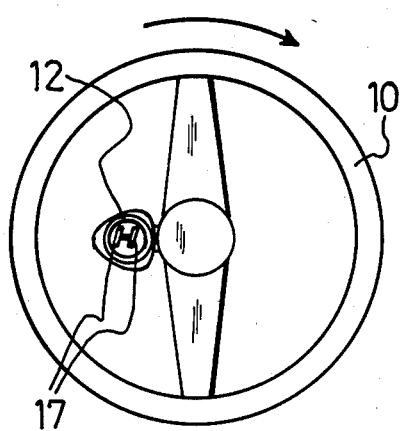
Figure 4:
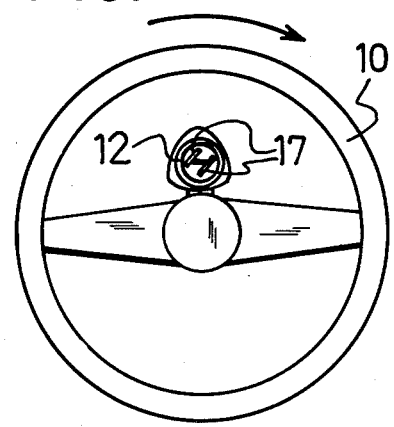

FIGS. 2-4 show the steering wheel as viewed from above in three turning positions. FIG. 2 shows the steering wheel in a neutral position, and the bands 17 will then extend in parallel to the longitudinal middle line of the car. In FIG. 3 the steering wheel has been rotated one half turn, the capsule 12 has followed this movement, and the bands 17 have been swung so they indicate the actual position of the front wheels in relation to the longitudinal middle line. It is thus easy to see what further turning must be made to achieve the desired result.

The various components in the transfer mechanism must of course be selected so the turning of the bands 17 really provide a true picture of the actual position of the front wheels.

In FIG. 4 the steering wheel 10 has been rotated further and the position of the bands has been correspondingly changed.

This result is obtainable without any mechanical connection to the front wheels due to a float 18, rotatable about the shaft 14, which strives to maintain a high position in the capsule.

Figure 5:
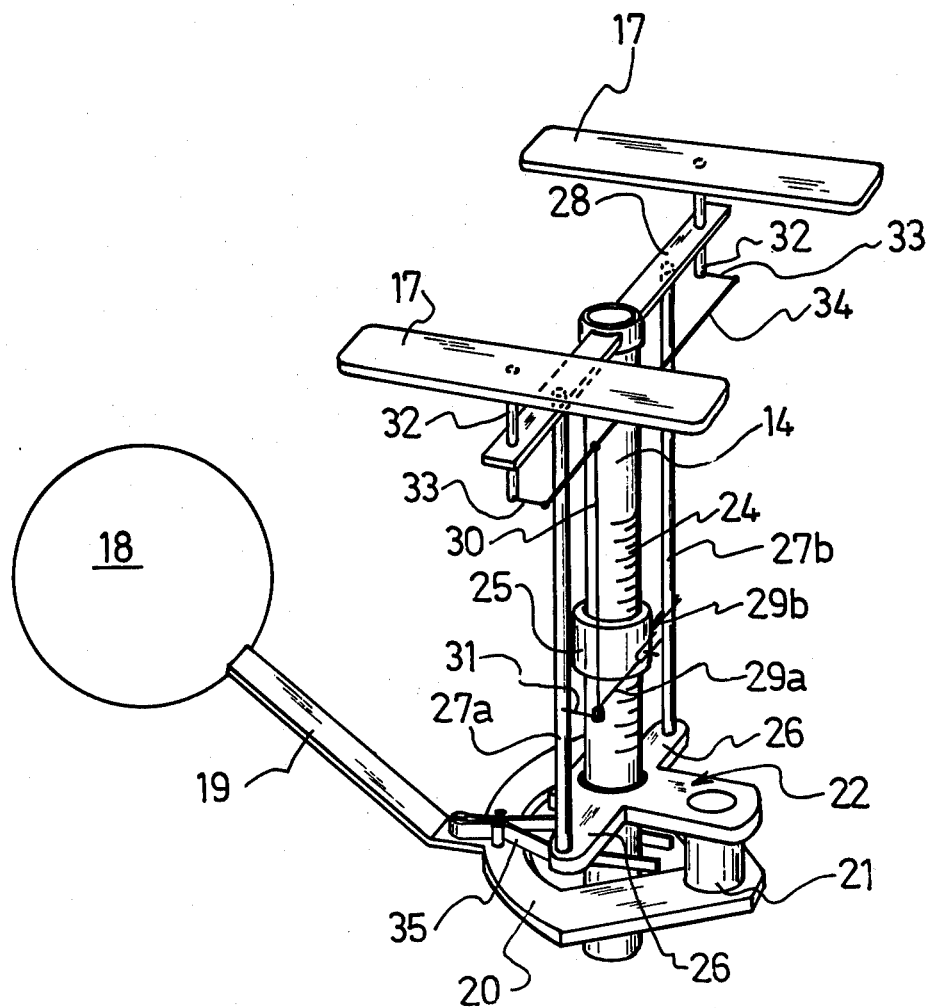
FIG. 5 shows a perspective view of the indicator mechanism removed from the capsule.

The transfer mechanism between the float 18 and the two bands 17, representing the front wheels, is in FIG. 5 shown removed from the capsule, and for the sake of simplicity the shaft 14 is here held vertically.

The float 18 is by means of a lever arm 19 connected to a sector lever 20, enclosing the shaft 14 and having its center to the opposite side thereof, as counted from the float 18. A short trunnion 21 extends upwards from this center and carries a cruciform member 22, which extends in parallel relationship to the sector lever 20, but at a distance from the latter. An annular cover plate 23 is rigidly connected to the inside of the capsule and a central cover plate portion 23a is connected to the shaft 14. Together the two cover plates will prevent the sighting of the internal components, which could otherwise possibly disturb the reading of the bands 17.

The shaft 14 is rigidly mounted in the bottom of the capsule, and has a central portion 24, which is externally threaded, and upon which a nut 25 is fitted.

The arms 26 of the cruciform member 22 are arranged so they reach out to the ends of the arc of the sector lever 20, and each of them carries a rod 27a, b, which extends in parallel relationship to the shaft 14, and is attached to an upper cross beam 28, which is journalled upon the shaft 14.

The rods 27a, b, are connected to the nut 25 by means of fork-shaped links 29a, b. Depending upon the direction of swinging movement of the float the nut will move upwards or downwards upon the shaft. The link 29a forms one of the arms of a bell crank lever 30, which is journalled upon rod 27a, where it swings about a horizontal peg 31. When the steering wheel is rotated the capsule, with shaft 14, is moved around the steering rod. The cover plates will not be influenced, but the float 18 will actuate the link mechanism so a relative movement between the nut 25 and the threaded portion occurs. This will turn the bands 17, while the cross beam 28 maintains a position in parallel to the transverse axis of the car.

The two parallel bands 17 are individually mounted at the beam 28 by means of vertical pegs 32 having sidewardly extending arms 33. The latter are interconnected by a parallel track rod 34, which is connected to the upwardly directed arm of the bell crank lever 30. The latter is, as mentioned above, connected to the nut 25 (vide also FIG. 8).

It is evident that a displacement of the nut 25 along the shaft 14 will actuate the bell crank lever 30, which, in turn, moves the parallel track rod 34 in one direction, or the other, and thus turns the bands 17.

As mentioned above the sizes of the various components of the link mechanism will have to be selected so the turning of the bands 17 really represent the actual position of the front wheels.

The device described above is intended for use during parking and reverse driving. During normal driving the float 18 will be subjected to the influence of strong centrifugal forces, which could damage the mechanism. To prevent such damage the indicator is provided with a safety device.

A fork-shaped leaf-spring 35 is fitted midway of the arc of the sector lever 20, in such a manner that it will enclose the shaft 14 in an open grip. The spring has sufficient strength to ensure that the sector lever 20 and the cruciform member 22 swings about the axis of shaft 14 during normal parking speed.

Figure 6:
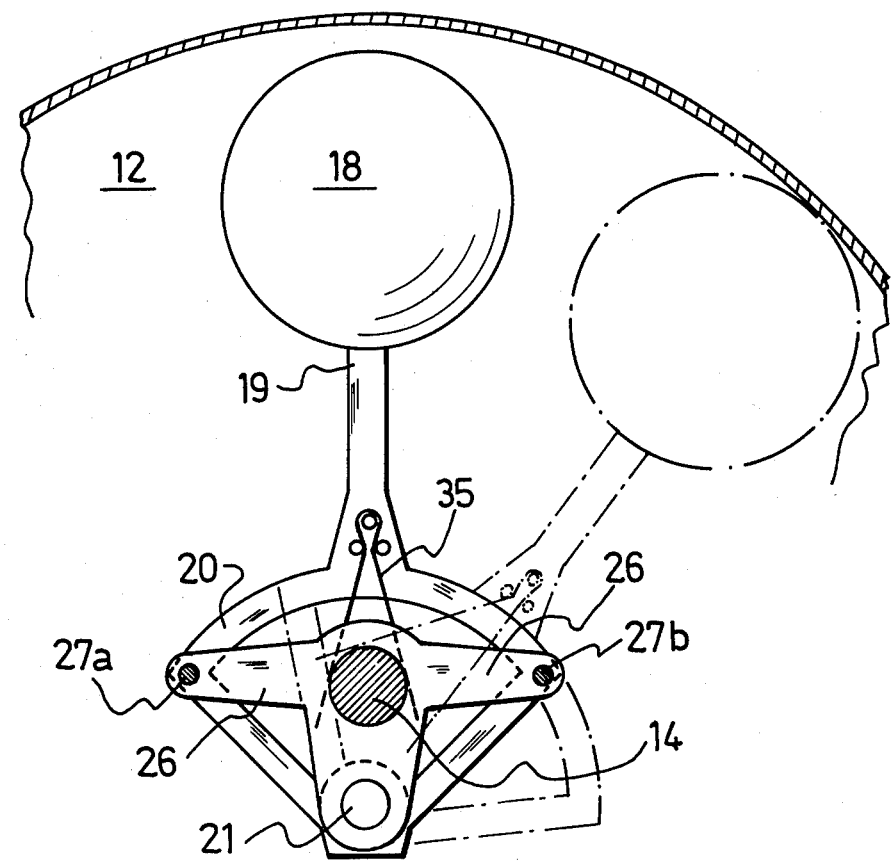
FIG. 6 shows a portion of the capsule with the float and its mounting at the shaft.

When the speed of the car is higher, and thus the centrifugal force will be higher, the spring 35 will be deformed as is indicated with broken lines in FIG. 6. The float 18 will then swing about trunnion 21, which means that it may come into contact with the walls of the capsule 12, so its movements will be braked.

Figure 7:
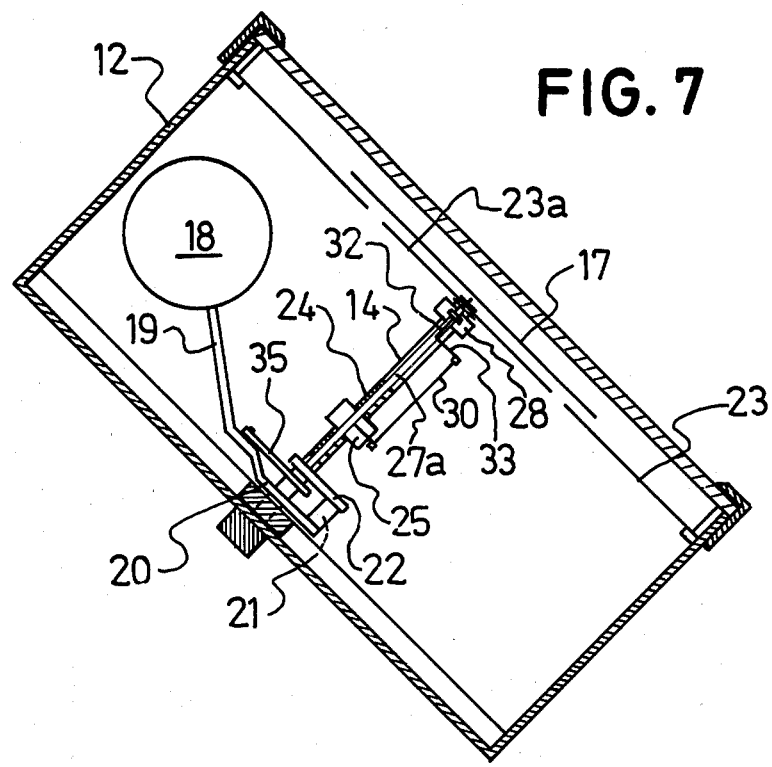
FIG. 7 shows a longitudinal section through the indicator, mounted at the steering wheel.
Figure 8:
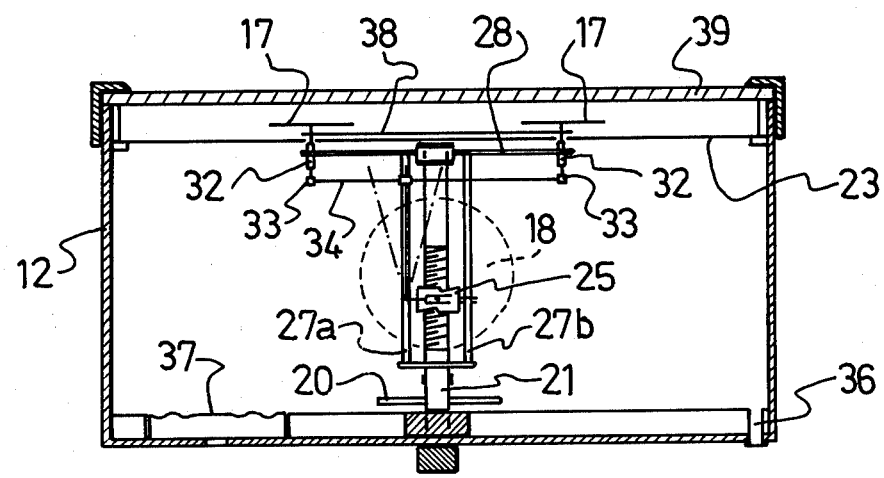
FIG. 8 shows a cross section through the indicator of FIG. 7.

FIGS. 7 and 8 show the mechanism according to FIG. 5 fitted into the capsule. FIG. 7 is a longitudinal section through the capsule in mounted position, and illustrates how the float 18 is located in an advantageous position so it can always retain the highest level within the capsule.

The capsule is provided with a nipple 36 for the supply of liquid, and with an outwardly open expansion chamber 37, which is inwardly covered by a resilient membrane for taking care of changes of volume in the liquid caused by variations in temperature.

The pegs 32 extend freely through the cover plate 23 and are, above the latter, interconnected by a further cross beam 38. The lid 39 of the capsule is of course transparent.

The components of the transfer mechanism are to be regarded as examples only, as many variations may occur withint the scope of the appended claims.

What I claim is:

1. A hydrostatic front wheel indicator for a motor car comprising:
   a liquid filled capsule having a transparent lid and means for mounting said capsule at the steering wheel of said car,
   a shaft mounted in said capsule in inclined relationship to a plumb line intersecting the longitudinal axis of said shaft,
   a front wheel position indicator rotatably mounted on said shaft and including spaced-apart, parallel bands indicating wheel position,
   a float in said capsule mounted for a swinging movement about said shaft, and
   linkage means for transferring movements of said float to said indicator comprising, a sector lever disposed normal to and enclosing said shaft, and means to mount said sector lever for swingable movement about said shaft at a point located at a side of said shaft opposite said float.

2. The front wheel indicator according to claim 1 wherein said shaft includes a threaded portion and said linkage means further comprises a nut cooperatively engaging said threaded portion.

3. The front wheel indicator according to claim 2, further comprising a cross beam carried by said shaft for rotatably mounting said bands on said cross-beam, a parallel track rod means interconnecting said bands, and a bell crank lever for transferring movements from said nut to said track rod means.

4. The front wheel indicator according to claim 1 wherein said linkage means further comprises a link arm connecting said sector lever to said float.

5. The front wheel indicator according to claim 4 wherein said linkage means further comprises a cruciform member having arms extending in opposite directions from a center piece, and a trunnion supported by said cruciform member for pivotally carrying said sector lever in parallel relationship thereto, each of said arms normally supporting a rod parallel to said shaft, and cross brace means interconnecting said rods.

6. The front wheel indicator according to claim 5, wherein said arms of said cruciform member extend over the ends of the arc of said sector lever and said rods are located substantially above said ends.

7. The front wheel indicator according to claim 1, further comprising a resilient fork mounted on said sector lever with its open legs extending towards said shaft to enclose and grip the shaft.

* * * * *